Figure 1:
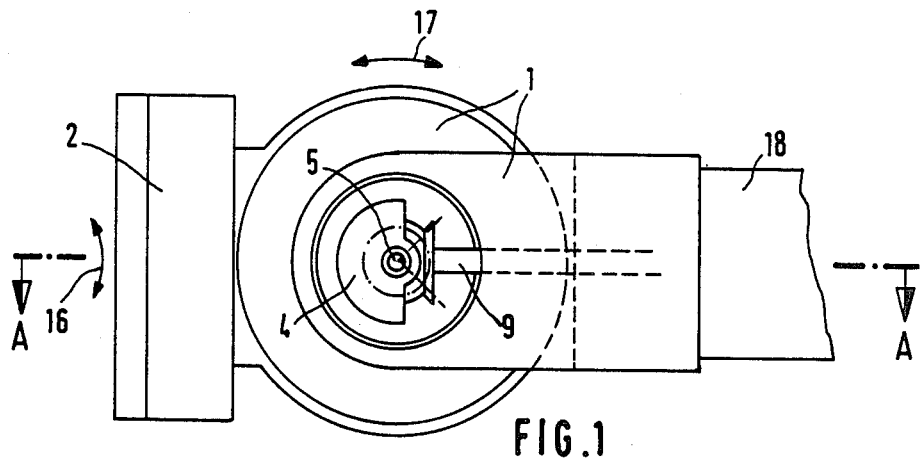

United States Patent [19]

Vetter et al.

[11] Patent Number: 4,760,753

[45] Date of Patent: Aug. 2, 1988

[54] SWIVEL HEAD FOR INDUSTRIAL ROBOTS

[75] Inventors: Ulrich Vetter, Unterschleissheim; Jürgen Neumeier, Münich, both of Fed. Rep. of Germany

[73] Assignee: Hans Heynau GmbH, Münich, Fed. Rep. of Germany

[21] Appl. No.: 45,807

[22] Filed: Apr. 24, 1987

Related U.S. Application Data

[63] Continuation of Ser. No. 801,981, Nov. 26, 1985, abandoned.

[30] Foreign Application Priority Data

Dec. 6, 1984 [DE] Fed. Rep. of Germany ....... 3444478

[51] Int. Cl.$^4$ .............................................. B25J 17/02
[52] U.S. Cl. ........................................ 74/479; 74/417; 901/26; 901/29
[58] Field of Search ............................. 901/28, 29, 26; 414/735; 74/665 B, 665 M, 417, 469, 479

[56] References Cited

U.S. PATENT DOCUMENTS

| Re. 28,437 | 6/1975 | Devol et al. ....................... 901/29 X |
| 2,822,094 | 2/1958 | Greer . |
| 3,739,923 | 6/1973 | Totsuka ............................ 901/29 X |
| 3,906,323 | 9/1975 | Ono et al. ......................... 901/29 X |
| 4,502,830 | 3/1985 | Inaba et al. ...................... 901/29 X |
| 4,608,884 | 9/1986 | Beyer ............................... 901/29 X |

FOREIGN PATENT DOCUMENTS

| 0101569 | 7/1983 | European Pat. Off. . |
| 3219292 | 11/1983 | Fed. Rep. of Germany . |
| 3408713 | 9/1984 | Fed. Rep. of Germany . |
| 8401536 | 4/1984 | World Int. Prop. O. ............ 901/29 |
| 8401539 | 4/1984 | World Int. Prop. O. ............ 901/29 |

Primary Examiner—Robert J. Spar
Assistant Examiner—P. McCoy Smith
Attorney, Agent, or Firm—Spencer & Frank

[57] ABSTRACT

A swivel head is disclosed having a one-piece, fork-shaped support housing in which a swivel housing adapted to the shape of the support housing is inserted and pivotally mounted by means of a cover and a bearing bracket.

1 Claim, 1 Drawing Sheet

SWIVEL HEAD FOR INDUSTRIAL ROBOTS

This application is a continuation of application Ser. No. 801,981, filed Nov. 26, 1985, now abandoned.

The present invention relates to a swivel head for industrial robots with two degrees of freedom and, correspondingly, two shafts whose axes intersect, and which are provided, respectively, for swiveling and rotating the tool and are driven by drive shafts with bevel gears.

Such a swivel head is known in the art (DE-OS No. 32 19 292). The prior art swivel head has the disadvantage of consisting of a great number of complex parts, so that both its manufacture and its assembly are complicated and costly.

Accordingly, the object of the invention is to provide a swivel head of the above kind whose component parts are easier to manufacture and assemble, whose support housing has a higher rigidity, and whose lubricant-containing spaces are easier to seal, namely with commercially available sealing elements.

According to the invention, this object is attained by providing a fork-shaped one-piece support housing into which a swivel housing is insertable which is adapted to the shape of the support housing and can be pivotally fixed to the support housing by means of a cover and a bearing bracket.

Figure 2:
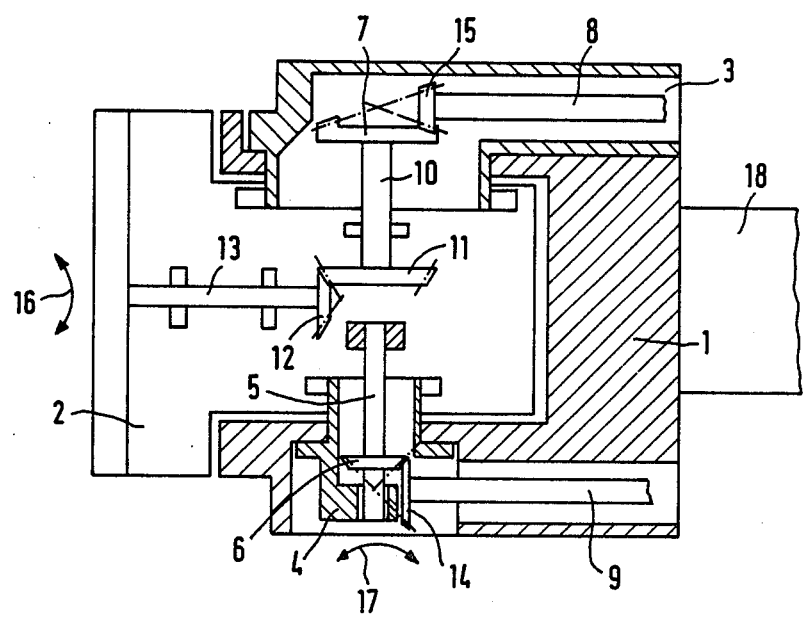

The invention will now be explained with reference to the accompanying drawing, in which:

FIG. 1 is a side view of an embodiment of the swivel head in accordance with the invention, and FIG. 2 is a section taken along line A—A of FIG. 1.

As can be seen in FIG. 1, the swivel head consists of the support housing 1, which—as will be explained in more detail below—is shaped like a fork having first and second spaced arm portions, with the space therebetween defined by generally parallel surfaces, said arm portions having aligned openings therethrough, with the arm portions having two headphone-like thickenings at its ends, and the swivel housing 2, which is inserted in the support housing 1 and arranged to swivel in the direction of arrow 17.

Further details of this embodiment of the swivel head are shown in FIG. 2. The fork-shaped support housing 1 can be clearly seen, which is undivided, totally enclosed, and thus oiltight. The swivel housing 2, having spaced generally parallel side surfaces, and which is adapted to the shape of the support housing 1, can be inserted into the support housing from the front end of the latter. The swivel housing 2 is centered in the support housing 1 between the parallel surfaces of the arm portions with the swivel housing side surfaces in proximate relation thereto, the support housing 1 and swivel housing 2 being interconnected by the lateral attachment of the cover 3 and the bearing bracket 4 through the openings in the arm portions into pivotal engagement with the swivel housing 2. Shaft 5 and bevel gear 6 as well as the bevel gears 7 and 11 with the shaft 10 are inserted from the sides. The swivel housing 2 is then centered in the support housing 1 by the lateral attachment of the cover 3 and the bearing bracket 4.

The shaft 10 is rotatably mounted in the swivel housing 2, and its ends are provided with the bevel gears 7 and 11. The bevel gear 11 meshes with the bevel gear 12 affixed to one end of the rotatably mounted shaft 13. Between the bevel gear 12 and the shaft 13, a transmission gearing may be disposed. The shaft 5 is rigidly connected with the swivel housing 2 and the bevel gear 6. Between the shaft 5 and the swivel housing 2, a transmission gearing may be disposed. The bevel gear 6 meshes with the bevel gear 14 affixed to the end of the drive shaft 9. The bevel gear 7 meshes with the bevel gear 15 affixed to the end of the drive shaft 8.

By rotating the drive shaft 8, the shaft 13 and, thus, a tool (not shown) mounted on its end opposite the bevel gear 11 are rotated. By rotating the drive shaft 9, the swivel housing 2 is caused to perform a swivelling motion about the axis of the shaft 5, as indicated by arrow 17.

The rotary motions of the drive shafts 8 and 9 can be transmitted to the shafts 10 and 5 direct or via one or more force-transmitting elements. They may be initiated, for example, via two coaxial shafts which are rotatably mounted in a receiving flange 18 and connected with the drive shafts by spur gears or timing belts.

We claim:

1. Swivel head for industrial robots with two degrees of freedom and, correspondingly, first and second drive shafts whose axes are coincident, and which are provided, respectively, for swiveling and rotating a tool and are driven by other drive shafts with bevel gears, characterized in that there is provided a fork-shaped one-piece support housing (1) having first and second spaced arm portions, with the space therebetween defined by generally parallel generally planar surfaces, said arm portions having aligned openings therethrough on a given axis a swivel housing (2) configured for receiving said second rotating drive shaft therein and having spaced generally parallel generally planar side surfaces insertable into the space between said arm portions in proximate relation with said parallel surfaces of said support housing, said swivel housing being adapted to the shape of the support housing and means for pivotally mounting said swivel housing to said support housing, said means including a generally hollow cover (3) having a portion thereof insertable through one of said openings in said arm portion, said cover being pivotally engaged with said swivel housing, and a bearing bracket (4) insertable through the other of said openings in said arm portions, said bearing bracket being pivotally engaged with said swivel housing, said bearing bracket being configured for rotatably supporting said first drive shaft therein on said given axis, and wherein said cover is configured for receiving at least some of the other drive shafts therein.

* * * * *